US005144751A

United States Patent [19]

Weber

[11] Patent Number: 5,144,751

[45] Date of Patent: Sep. 8, 1992

[54] METHOD AND APPARATUS FOR CONTROLLING SAW CHAIN TENSION

[75] Inventor: Johann Weber, Estacada, Oreg.

[73] Assignee: Blount, Inc., Portland, Oreg.

[21] Appl. No.: 742,902

[22] Filed: Aug. 9, 1991

[51] Int. Cl.[5] .............. B23D 57/02

[52] U.S. Cl. .............. 30/386; 30/383

[58] Field of Search .............. 30/383, 385, 386, 381

[56] References Cited

U.S. PATENT DOCUMENTS

| | | | |
|---|---|---|---|
| 4,026,020 | 5/1977 | Hoppner et al. | 30/386 |
| 4,563,817 | 1/1986 | Leighton | 30/386 |
| 4,920,650 | 5/1990 | Edlund | 30/386 |
| 4,999,918 | 3/1991 | Schliemann et al. | 30/386 |

*Primary Examiner*—Douglas D. Watts

*Attorney, Agent, or Firm*—Robert L. Harrington

[57] ABSTRACT

Method and apparatus for manually applying a selected fit of a saw chain loop to a chain saw. A tensioning procedure is performed simply by loosening a guide bar hold-down screw. The loosened guide bar is slightly spaced away from the mounting plate of the chain saw as a spring extends the guide bar relative to a drive sprocket which tightens the saw chain. The hold-down screw, which has an inclined axis, is then tightened to force the saw bar obliquely toward the mounting plate, simultaneously forcing the guide bar in a longitudinal direction that backs off the saw chain tension by a predetermined amount.

12 Claims, 2 Drawing Sheets

METHOD AND APPARATUS FOR CONTROLLING SAW CHAIN TENSION

FIELD OF INVENTION

This invention relates to power-driven chain saws, and particularly to that category of chain saws having a limited power source such as used for cutting tree limbs and the like, the invention providing a desired fit of a saw chain to a guide bar that reduces tension and thereby resistance to the driving of the saw chain around the guide bar.

Chain saws are commonly perceived to be high powered tools that drive interconnected saw chain links of hardened steel around an elongate guide bar for cutting down trees. The "chain saw" of the present invention does not fit this perception. It has structural similarities but on a much reduced scale. The chain is made of wire links and the power source is typically battery powered. The cutting bar length is about two to three inches long and the saw is operated with one hand as one would operate a pruning saw. In many respects, the operational characteristics of the conventional chain saw are not applicable to the smaller chain saw pruner of the following disclosure. However, because of the similarities in the structural arrangement of their respective components, for ease of explanation and understanding, the well known terminology of chain saws are applied to the pruning saw disclosure of this invention.

BACKGROUND OF THE INVENTION

The components of a chain saw in general, including the chain saw pruner contemplated for the present invention, typically include a loop of saw chain consisting of interconnected links (wire sections shaped into links) having cutting teeth (e.g., a sharpened end of the wire link). An elongate planar element termed a guide bar or blade supports and guides the saw-chain loop in a peripheral groove of the bar, the loop is driven in rapid rotation around the guide bar by a sprocket disposed at one end of the bar and mounted on a chain saw housing to which the blade is attached. The sprocket is coupled to an output shaft of the power head of the chain saw.

Proper tension of the saw chain must be established and maintained so that the chain will track smoothly around the guide bar and over teeth of the sprocket without binding, and without excessive looseness, which could cause undesirable vibrations of the chain or even cause the chain to become untracked from the guide bar.

The guide bar of the conventional high-powered chain saw is adapted to be slidably movable longitudinally with respect to the sprocket to permit adjustment in the tension of the saw chain from time to time as the chain wears. The adjustment generally is effected by manual means such as a threaded member having an element bearing longitudinally upon the guide bar.

The advent of chain saw pruners has made the manual adjustment of saw chain tension more difficult because the range of variation of movement permitted to establish proper chain tension diminishes substantially in smaller chain saws. For example, a small chain saw with a saw-chain loop less than fourteen centimeters (5-½ inches) long and 4.5 centimeters (1-¾ inches) wide may require an adjustment in relative distance between the guide bar and the sprocket of as little as 0.150 millimeter (0.006 inch). This can make the difference between a tight chain that consumes the power of the motor needed to drive the chain for cutting, and a free running chain that permits the power of the motor to be applied to the desired cutting action.

SUMMARY OF THE INVENTION

The present invention provides a method and apparatus for first applying tension to a loop of saw chain disposed around a generally planar guide bar to force a tight fit of the chain on the bar, and then releasing the tension by a minute amount that frees the chain while retaining the fit necessary to insure that it remains tracked on the guide bar. In the preferred embodiment, the guide bar is movable relative to the sprocket, the sprocket being in a fixed relationship to a mounting plate and the guide bar slidable relative to the mounting plate. A spring pushes the guide bar away from the sprocket to achieve the initial tight fit. A fastener in a loosened state projects angularly through the bar and into the mounting plate. As the fastener is tightened, it forces controlled rearward movement of the bar. The tight fit of the chain on the bar is thereby relieved by the precise, controlled retraction of the bar relative to the sprocket.

The fastener and its associated mechanism are designed to allow slight variations in the spacing between the sprocket and bar in the tight fit condition, i.e., for accommodating variations in the chain length, and regardless thereof to provide the same precise relief that assures a consistent fit of the chain following the clamping or tightening step.

DETAILED DESCRIPTION AND DRAWING

The invention will be more fully understood by reference to the following detailed description of a preferred embodiment with reference also to the accompanying drawings wherein.

Figure 1:
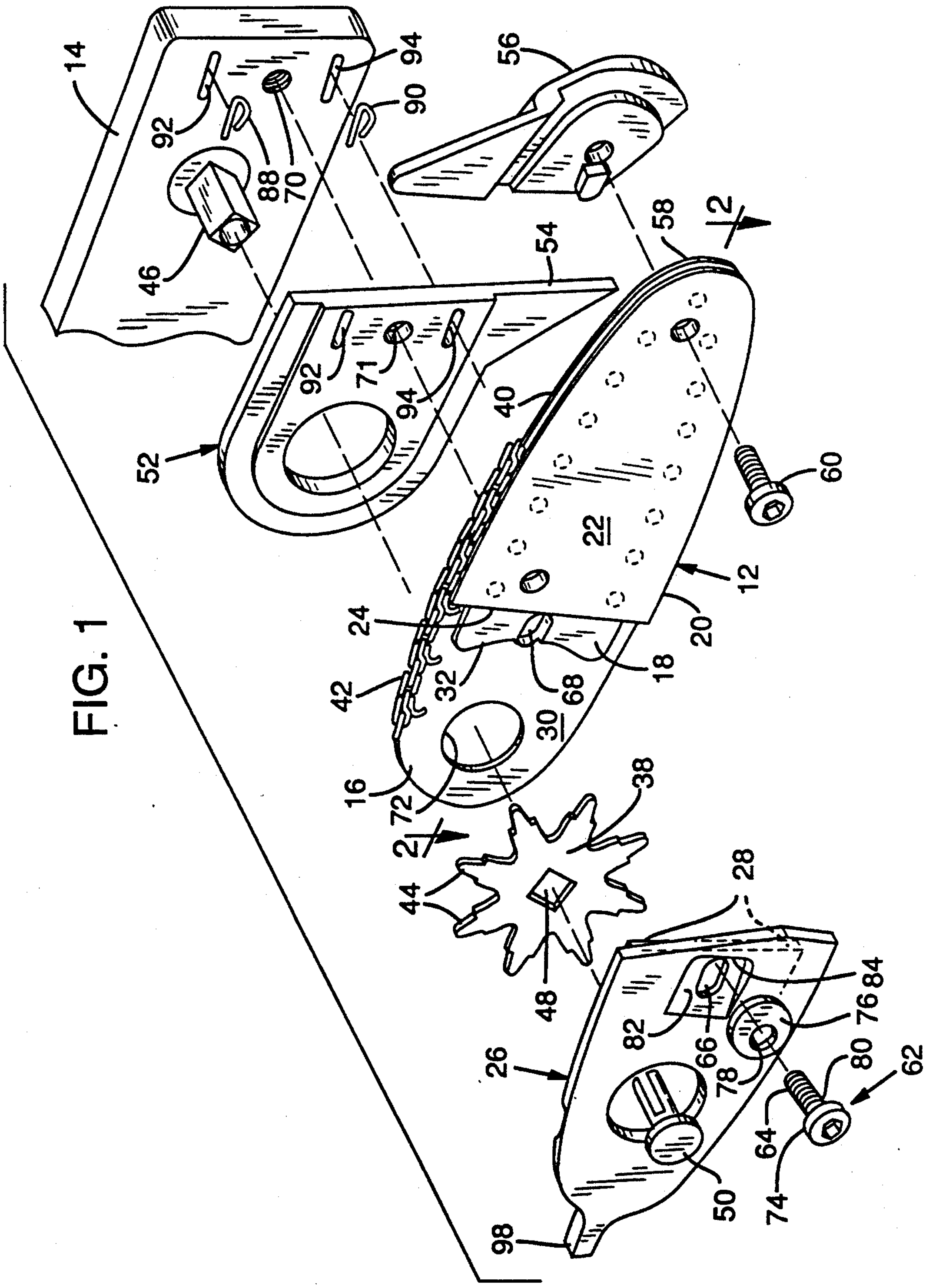
FIG. 1 is an exploded perspective view of a portion of a chain saw incorporating the present invention.
Figures 2, 3, 4, 5:
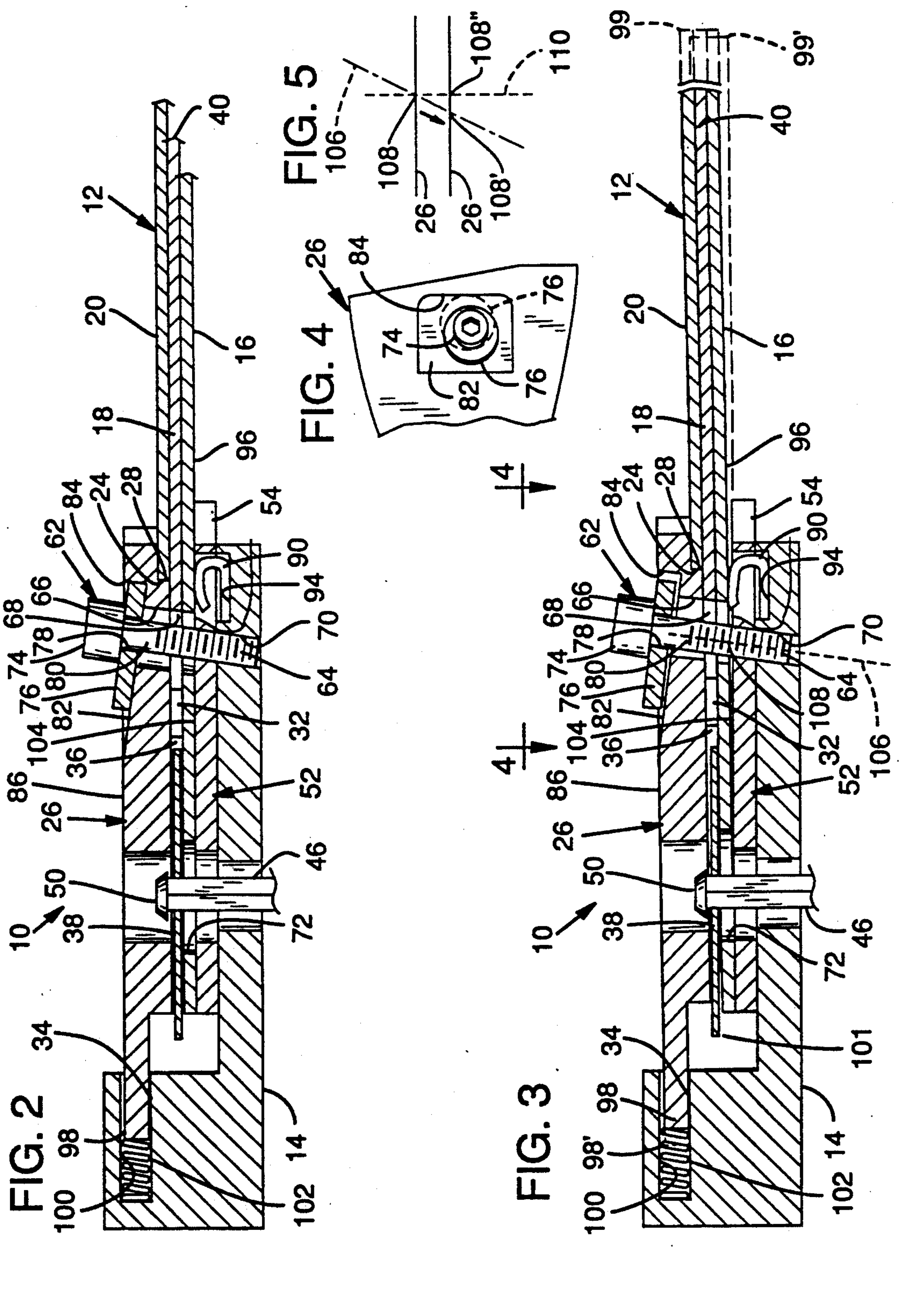
FIG. 2 is a section view, partially cut away, of a portion of a chain saw according to the present invention, the view taken generally from the direction of lines 2—2 of FIG. 1.
FIG. 3 is a view similar to FIG. 2 but showing the components of the chain saw in the pre-tightened condition.
FIG. 4 is a view taken on view lines 4—4 of FIG. 3.
FIG. 5 is a geometric representation of the guide bar retraction that results when clamping the guide bar to the mounting plate.

Referring to FIGS. 1 and 2, an assembly 10 which forms a part of a chain saw includes an oblong laminated guide bar 12 adapted for attachment to a mounting plate 14 of a chain saw housing. The laminate structure of the guide bar 12 includes a full length base plate 16, an inner plate 18 and an outer plate 20 (near side in FIG. 1) disposed on the extended body portion 22 of the guide bar 12, the outer plate 20 terminating at a back edge 24 as illustrated. A tension plate 26 having an interiorly disposed forward facing edge 28, which engages the back edge 24 of the outer plate 20, covers end 30 of the guide bar 12 and is held spaced apart from the base plate 16 of guide bar 12 by the arcuately shaped back end 32 of the inner plate 18 and an extended surface 34 of the mounting plate 14, to define a space 36 in which a drive sprocket 38 is disposed. The laminated plates 16, 18, 20 and the tension plate 26 define a peripheral groove or guideway 40 around which a loop of wire saw chain 42 tracks in high-speed rotation, entrained and driven by teeth 44 of the drive sprocket 38 which engage the links of the saw chain 42. (Note that tension plate 26 can be considered to be a part of the guide bar and general references to the guide bar may encompass the tension plate.)

The drive sprocket 38 is rotatably supported on a drive shaft 46 of the chain saw and is keyed for rotation therewith by a square aperture 48 through the sprocket which is engaged on the square drive shaft 46. A push pin 50 is provided for retaining the sprocket 38 on the shaft 46, when the tension plate 26 is removed from the guide bar 12. The drive shaft 46 is journaled and rotatably supported in the mounting plate 14 such that the drive sprocket 38 is disposed generally in the space 36 at the end 30 of the guide bar 12 between the tension plate 26 and the base plate 16. A guard plate 52 mounted between the guide bar 12 and the mounting plate 14 carries a bucking spike 54 and provides a safety shield adjacent to the saw chain 42 at the end 30 of the blade 12. A safety nose guard 56 is attached to the opposite end 58 of the guide bar 12 by a suitable fastener such as a machine screw 60.

The guide bar 12 is held to the mounting plate 14 in abutting relation therewith by a hold-down fastener 62, suitably a hex head machine screw having a threaded end 64 which extends through elongate slots 66, 68 defined, respectively, in the tension plate 26 and the guide bar 12, and engages a threaded bore 70 in the mounting plate 14. The screw shaft projects through hole 71 of guard plate 56 as indicated in FIG. 1. The slots 66, 68 are elongated lengthwise with respect to the guide bar 12, and the base plate 16 of the guide bar 12 is provided with an enlarged opening 72 to allow longitudinal translation of the guide bar with respect to the output drive shaft 46 and the sprocket 38, which remain fixed in relation to the mounting plate 14 and guard plate 52. The head 74 of machine screw 62 bears on a washer 76 having a hole 78 through which the body 80 of the screw 62 fits closely. The hole 78 is off center, i.e., it is eccentrically located in the washer 76. The washer 76 seats on a bevel surface 82 defined in the tension plate 26, and peripherally abuts a forward edge 84 of the depression formed in the tension plate 26 by the bevel 82, the edge 84 being perpendicular to the bevel 82 and transverse to the longitudinal dimension of the guide bar.

FIG. 2 illustrates the assembly 10 in its fully assembled state, whereas FIG. 3 illustrates the assembly 10 prior to the guide bar 12 being secured by screw 62. As shown, wire springs 88, 90 urge the bar 12 away from mounting plate 14 in FIG. 3. Spring 102 provided in a bore 100 of mounting plate 14 acts against tang 98 of tension plate 26 to urge the tension plate 26 forward. Forward edge 28 of the tension plate 26 engages back edge 24 on the guide bar to urge the guide bar forward. Although not shown in FIGS. 2 and 3, it will be understood that the chain 42 shown in FIG. 1 is looped around the drive sprocket 38 and guide way 40 of guide bar 12. The sprocket 38 is fixed to the drive shaft 46 and thus is fixed relative to the mounting plate 14. The effect of the spring 102 is to force the guide bar as far forward as permitted by the length of the loop of saw chain 42. (Sliding movement of the guide bar and tension plate 26 relative to screw 62 is permitted because of the elongated slots 66, 68 in the tension plate and guide bar, respectively.)

If the guide bar were to be clamped down onto the mounting plate with the guide bar under tension from spring 102, the saw chain would not slide freely around the guide way 40 of the guide bar 12 due to the increased friction created by the tension. A significant portion of the available power of the chain saw (as available for the pruner type chain saw herein contemplated), would be consumed by this friction and the cutting capability of the saw would be severely restricted. Thus, it is desirable to slide the guide bar slightly rearward before clamping it to the mounting plate. However, such rearward sliding must be carefully controlled so as not to create a loose fit of the chain such as would allow the chain to come off the bar.

FIG. 3 illustrates how the present invention controls this rearward sliding. As shown, clamping screw 62 is angled and is backed out of its full seating in the mounting plate and the guide bar 12 is slightly elevated from the mounting plate as urged by springs 88, 90 (compare FIGS. 2 and 3). The dash line below the guide bar in FIG. 3 indicates the position of the guide bar after it is clamped onto the mounting plate, i.e., as illustrated in FIG. 2. Reference 99 indicates the extreme outer end of the bar 12 and reference 101 illustrates the extreme inner end of the sprocket 38 and the distance between these points is the distance encompassed by the saw chain loop prior to tightening. Screw 62, when tightened, draws the tension plate 26 downwardly and rearwardly. This draws edge 28 of the tension plate 26 rearwardly aqainst the spring force of spring 102 and permits sliding of the guide bar rearwardly induced in part by the urging of the tension fit of the saw chain and in part by the frictional surface contact as between the tension plate and the guide bar whereby the guide bar is urged to move with the tension plate. The wire springs 88, 90 are designed to minimize resistance of this induced rearward sliding.

The effect of this rearward sliding of the tension plate 26 is to shorten the front-to-rear length of the chain loop. This is illustrated by reference point 99′ which shows the position of the extreme outer end of the bar 12 after clamping. Now the distance encompassed by the saw chain loop is the distance between points 101 and 99′ which will be observed to be slightly less than the pre-tightened distance between points 101 and 99. As explained, the urging of spring 102 is relieved by the rearward movement of tension plate 26 indicated by the dash line position 98′ of tang 98.

The threaded bore 70 in the mounting plate 14 dictates the angle at which the tension plate 26 is drawn toward the mounting plate. The extent by which the chain loop distance is shortened is a factor of how far the tension plate 26 is forced rearward relative to the mounting plate 14, i.e., the solid line position 98 versus the dash line 98′ illustrated in FIG. 3. Refer also to FIG. 5. Line 106 is the axis through fastener 62. Point 108 is the point on axis 106 that protrudes through the bottom of tension plate 26 before the tension plate is tightened by fastener 62. Point 108′ (FIG. 5 only) represents the point 108 after the fastener has clamped the tension plate to the mounting plate, i.e., the position of FIG. 2. Line 110 represents the axis of movement that would be required of fastener 62 to avoid any rearward movement of tang 98, i.e., with point 108 moved downward to point 108″. The distance between 108′ and 108′ is the distance of rearward sliding of tang 98 to position 98, and represents the difference of rearward sliding of guide bar 12, i.e., between the points 99 and 99′.

To illustrate by way of example, consider a desired distance of relief of the saw chain loop to be 0.006 inch. Whereas trial and error can be used to find the angle for axis 106, it can also be calculated if one first determines the distance of vertical movement of tension plate 2 along line 110 to achieve full clamping. The angle between line 106 and line 110 can be referred to as alpha and the letter d the distance of movement of plate 26 along line 110. The tangent of angle alpha is thus equal to 0.006 inches divided by d which thereby identifies angle alpha.

As previously explained, the relative movement of the tension plate and guide bar is permitted because of the elongate slots 66 and 68 in the tension plate and guide bar. Tightening of fastener 62 causes the fastener to move rearwardly which urges rearward sliding of the tension plate 26 against spring 102. This urging translates into rearward movement of the tension plate due to the frictional contact as between washer 76 secured to the fastener and the top surface of the tension plate. Also, the top surface engaged by the washer is beveled rearwardly creating a rearwardly directed force vector. As previously explained, the guide bar is urged rearwardly by the chain tension and also by the friction contact between the tension plate and guide bar. Note, however, that the structure need not rely on friction. It is possible to make the bar and tension plate as one piece. Also, pins could be projected from the tension plate into receiving holes in the guide bar.

Washer 76 provides the further benefit of preventing rearward slipping of the guide bar after clamping and during operation of the chain saw. It will be appreciated that the chain saw is subject to very abusive handling including considerable vibration. Spring 102 and the clamping pressure of the fastener 62 may not be adequate to prevent the tension plate 26 and guide bar from slipping rearward relative to the sprocket 38. Such slipping can occur because of the spacing fore and aft of the shaft 80 of fastener 62 provided by the slots 66, 68. On the other hand, this spacing is required to accommodate slight differences in the lengths of different saw chain loops. Thus, in the non-clamped condition the point 108, where the fastener axis 106 projects through the tension plate 26 (See FIG. 5), will vary and that can only be accommodated b the elongated slots.

The special configuration of the washer 7 provides the positive lock up of the guide bar position. This configuration is provided by the bore 78 of washer 76 being offset from the center of the washer 76. With reference to FIG. 4, consider the position of FIG. 3 wherein fastener 62 is loosened but is nevertheless projected through washer 76, through slots 66, 68 and is threaded into bore 70. Springs 88, 90 urge the guide bar and tension plate to the elevated position as shown (the spacing over the dash line position) and the coil spring 102 urges the guide bar 12 to fully extend the saw chain loop to whatever length is required to achieve a tension fit, i.e., it is extended to the position of reference 99.

Preferably the washer is positioned against the fastener head 74, e.g., it has a sufficiently close fit to resist sliding rotatably or axially on the fastener shaft 80. The washer thus turns with the fastener. As the washer 76 is screwed down toward the beveled surface 82, the washer continues to turn until the periphery of the washer abuts the edge 84. This abutment occurs just prior to the downward movement of the tension plate and can occur at any angular position of the washer. If the loop of chain is of the longer length, the larger side of the eccentric will extend forward before engaging the edge 84. Shorter lengths of saw chain loops will result in abutment of the eccentric closer to the center bore, i.e., with the large end of the eccentric projected toward the rear. Once the eccentric is abutted against the edge 84, further turning of the screw fastener 62 achieves the desired clamping while the washer 76 remains abutted aqainst the edge 84 to lock the tension plate against rearward sliding, i.e., to prevent further loosening of the chain. See FIG. 4 wherein the solid line position of washer 76 is illustrated prior to engagement of the washer with tension plate 26 and the dash line position of washer 76 after engagement.

The above-described embodiment is but one example of the invention and is subject to numerous variations and modifications without departing from the invention as defined in the claims appended hereto.

I claim:

1. A chain saw having a rotatably driven drive shaft, a sprocket mounted on the drive shaft for rotation therewith, a guide bar positioned relative to the sprocket and cooperatively defining an endless guide way, and a saw chain loop mounted on said guide way to be driven by said sprocket around the endless guide way, and mechanism for fitting the saw chain to the guide way comprising:

a mounting member having a fixed relationship to the sprocket, a fastener for fastening the guide bar to the mounting member and being movable between first and second fastening positions, in said first fastening position said guide bar being slidable relative to said sprocket to extend the length of the guide way to the maximum length permitted by the length of the saw chain loop and in the transition of movement of the fastener to said second fastening position said guide bar being urged to a predetermined retraction of said guide bar relative to said sprocket.

2. A chain saw as defined in claim 1 including a biasing means urging extension of said guide bar relative to said sprocket in said first fastening position of said fastener.

3. A chain saw as defined in claim 2 wherein the mounting member is a mounting plate mounted along side the guide bar, second biasing means urging the guide bar to a predetermined side by side spacing from the mounting plate with the fastener in said first fastening position, and in the transition to said second fastening position said fastener urging the guide bar towards said mounting plate and in the process urging retraction of the guide bar relative to the sprocket.

4. A chain saw as defined in claim 3 wherein said fastener includes a screw having a head and threaded shaft, a threaded bore in said mounting plate engaging the threaded shaft whereby the threaded shaft is screwed into the threaded bore in the transition between the first and second fastening positions, said threaded bore angled rearwardly, said shaft protruded through the guide bar with the head engaging and forcing the guide bar toward the mounting plate as the shaft is screwed into the threaded bore between said first and second fastening positions, said shaft being angled toward the sprocket and moving rearwardly in the transition whereby the screw head urges rearward sliding of the guide bar as it is forced toward the mounting plate.

5. A chain saw as defined in claim 4 wherein a tension plate forms a part of the guide bar, a retral tang on the tension plate, said biasing means being a coil spring urged against said retral tang for urging the tension plate and the guide bar to an extended position relative to the drive sprocket.

6. A chain saw as defined in claim 5 wherein a beveled surface area on the tension plate provides the area of engagement by the screw head, said beveled surface area perpendicular to the threaded shaft and an edge formed at the rear edge of the beveled surface area, a washer having a bore that is located eccentrically on the washer, said shaft protruded through the bore and the washer abutting the screw head between the head and the beveled surface, said washer being turned with the shaft until abutting said rear edge of the beveled surface area, said guide bar including a tension plate having limited sliding movement relative to the threaded shaft to permit extension of the guide bar relative to the sprocket, and said abutment of the washer against the rear edge preventing rearward sliding of the guide bar relative to the shaft whereby the rearwardly directed movement of the head and shaft of the fastener controls the rearward retraction of the guide bar.

7. In a chain saw, a method of fitting a loop of saw chain disposed around generally planar guide bar and a chain drive element, the chain drive element being rotatably affixed relative to a mounting member of a chain saw, a fastener having a first position for holding the guide bar while permitting limited sliding movement thereof relative to the mounting member and having a second position for fixedly locking the guide bar to the mounting member, the method comprising the steps of:

spacing the plane of the guide bar slightly from that of the mounting member with the fastener in the first position;

urging the guide bar in a first longitudinal direction away from the drive element in the plane of the guide bar to tighten the chain around the guide bar and chain drive element; and moving the fastener to the second position and in the transition forcing the guide bar obliquely toward the mounting member at a predetermined angle to simultaneously force the guide bar into abutment with the mounting member while urging the guide bar a predetermined distance toward the drive element thereby relieving the previously tightened chain tension and establishing a desired fit of the saw chain to the guide bar and drive element.

8. A chain saw including a loop of saw chain, a mounting member, a generally planar guide bar, a drive sprocket rotatably affixed relative to the mounting member, means for driving the sprocket, the saw chain being engaged by the drive sprocket and peripherally entrained on the guide bar, releasable holding means engageable with the mounting member for holding the guide bar in abutting relation to the mounting member, and biasing means operable upon releasing the holding means for urging the guide bar in the plane of the guide bar away from the drive sprocket to tension the saw chain with respect to the drive sprocket, wherein the improvement comprises:

adjusting means for manually releasing a predetermined portion of the tension of the saw chain, the adjusting means including means for spacing the guide bar from the mounting member upon release of the holding means, the guide bar being simultaneously urged by the biasing means in a first direction which tightens the saw chain in relation to the drive sprocket to a binding tension; and the adjusting means including bias means operable when the holding means engages the mounting member to force the guide bar into abutting relation to the mounting member and simultaneously urging the guide bar a predetermined distance toward the drive sprocket to release the predetermined portion of the tension of the saw chain.

9. The chain saw according to claim 8 wherein the releasable guide bar holding means comprises a screw and the bias means comprises an inclined bore receiving the screw, the bore being inclined at predetermined angle from normal to the plane of the guide bar and in a plane normal to the guide-bar plane, the incline being in a direction such that tightening the screw forces the guide bar toward the drive sprocket.

10. The chain saw according to claim 9 further comprising:

a bevel surface of the guide bar, the bevel surface being normal to the inclined bore and defining a beveled recess having an edge parallel to the inclined bore and perpendicular to the plane normal to the guide-bar plane; and a washer having a hole receiving the screw closely therethrough, said hole located eccentrically on the washer, an edge of the eccentric washer bearing on the edge of the beveled recess, the washer holding the guide bar against rearward sliding of the guide bar relative to the screw.

11. A cutting tool, comprising:

a mounting element;

a generally planar guide bar;

a drive sprocket rotatably affixed relative to the mounting element;

a powered drive mechanism having an output drive member coupled to the drive sprocket;

a loop of saw chain engaged by the drive sprocket and peripherally entrained on the guide bar;

a hold-down fastener engageable with the mounting element, the fastener releasably holding the guide bar in an abutting relation with the mounting element and in said abutting relation defining a guide bar plane, the guide bar being slidably movable in relation to the drive sprocket when the hold-down fastener is loosened;

a first spring member urging the guide bar in a first direction which increases the tension of the saw chain, the first spring member being operable upon loosening of the hold-down fastener to establish a binding tension in the saw chain;

a second spring member urging the guide bar in a direction normal to the plane of the guide bar, the second spring member being operable upon loosening of the hold-down fastener to urge the guide bar into a spaced relation with the mounting element; and the hold-down fastener having an axis with a bias of predetermined angle from normal to the guide-bar plane, the bias being in a direction such that tightening the hold-down fastener forces the guide bar away from its spaced orientation toward the abutting relation with the mounting element while simultaneously forcing the guide bar slidably a predetermined distance in a direction opposite the first direction thereby relieving the binding tension of the saw chain and relieving a predetermined portion of the tension of the saw chain.

12. The cutting tool according to claim 11 further comprising:

a bevel surface of the guide bar, the bevel surface being normal to the axis of the hold-down fastener and defining a beveled recess having an edge parallel to the axis and perpendicular to the plane normal to the guide-bar plane; and a washer disposed on the bevel surface and having a hole eccentrically located and receiving the hold-down fastener closely therethrough, an edge of the eccentric washer bearing on the edge of the beveled recess, the washer holding the guide bar against rearward sliding relative to the fastener.

* * * * *